M. & O. HELGESON.
HARVESTER.
APPLICATION FILED MAR. 28, 1910.
1,057,392.
Patented Mar. 25, 1913.
5 SHEETS—SHEET 1.
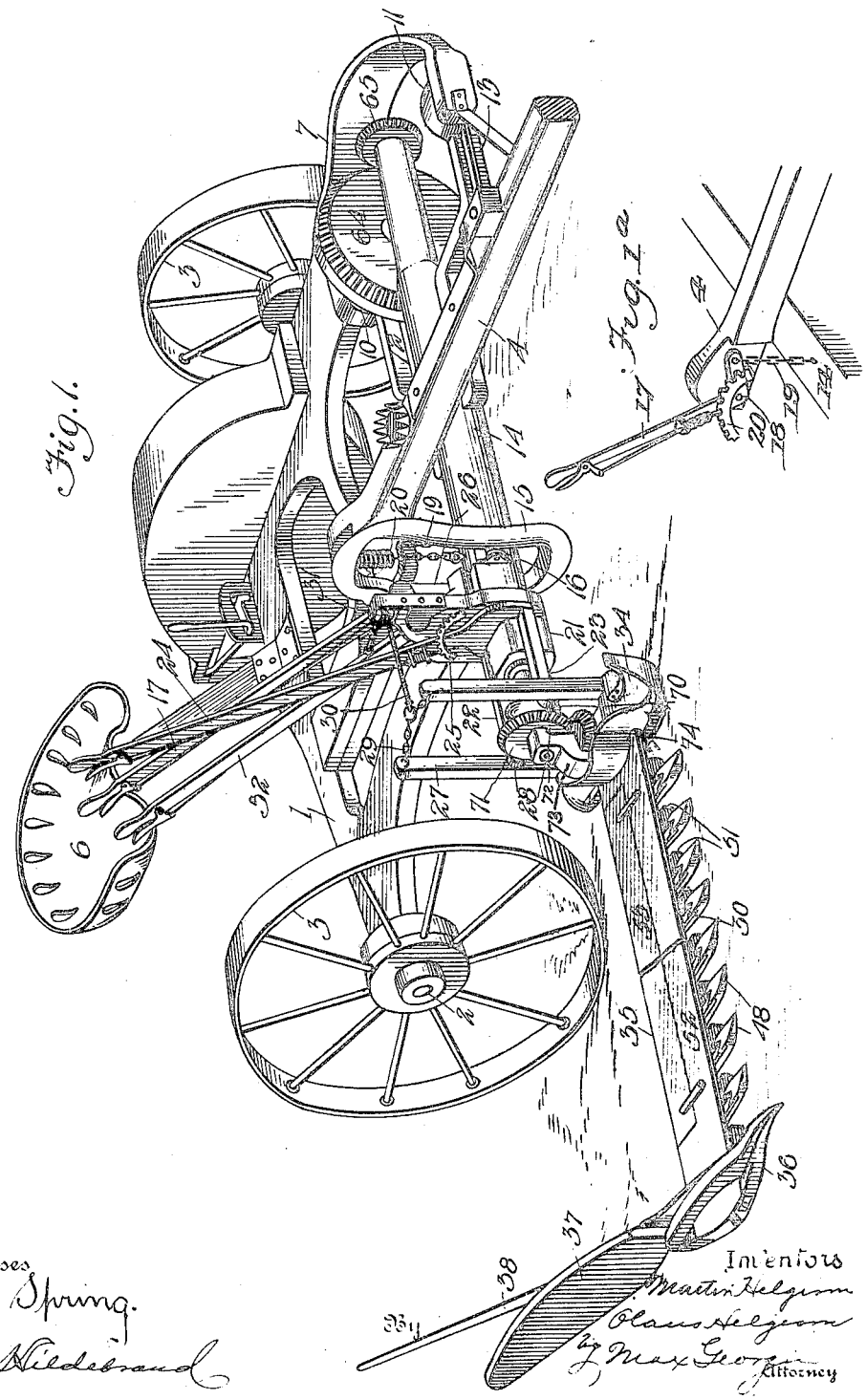

M. & O. HELGESON.
HARVESTER.
APPLICATION FILED MAR. 28, 1910.
1,057,392.
Patented Mar. 25, 1913.
5 SHEETS—SHEET 2.
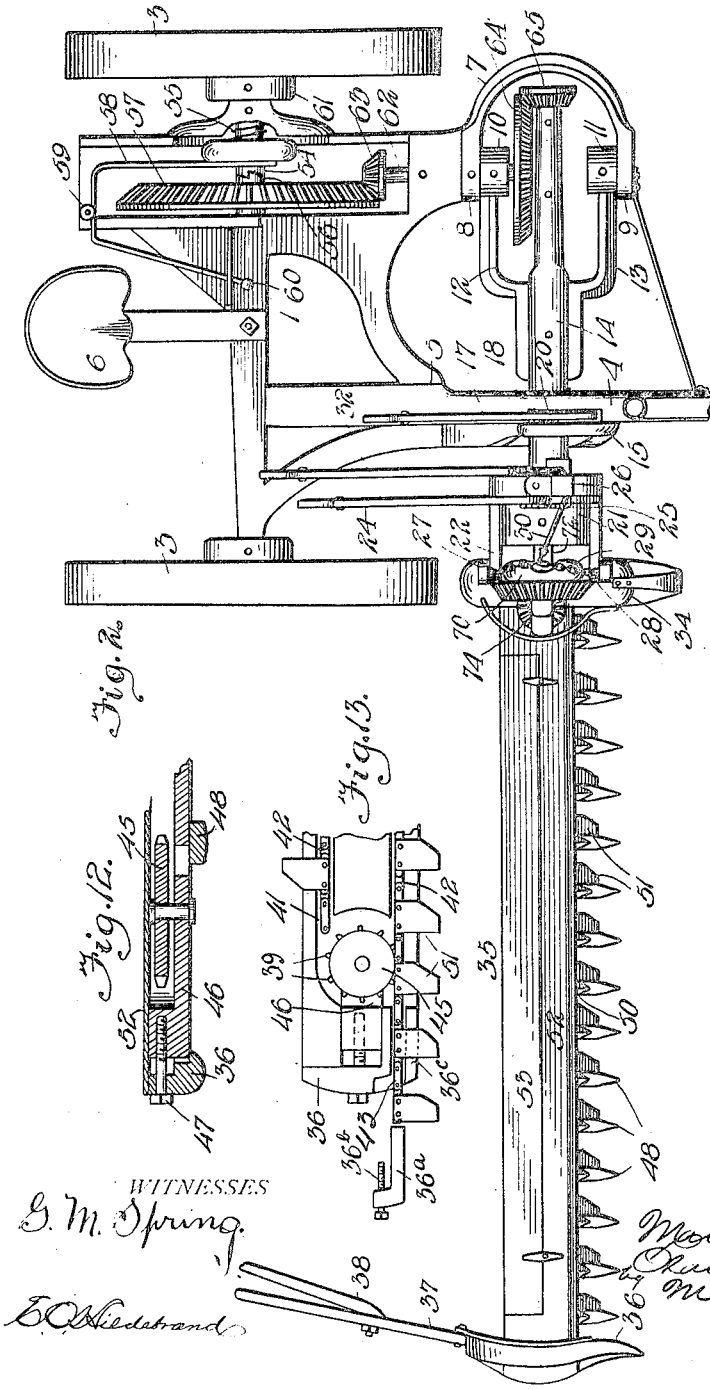
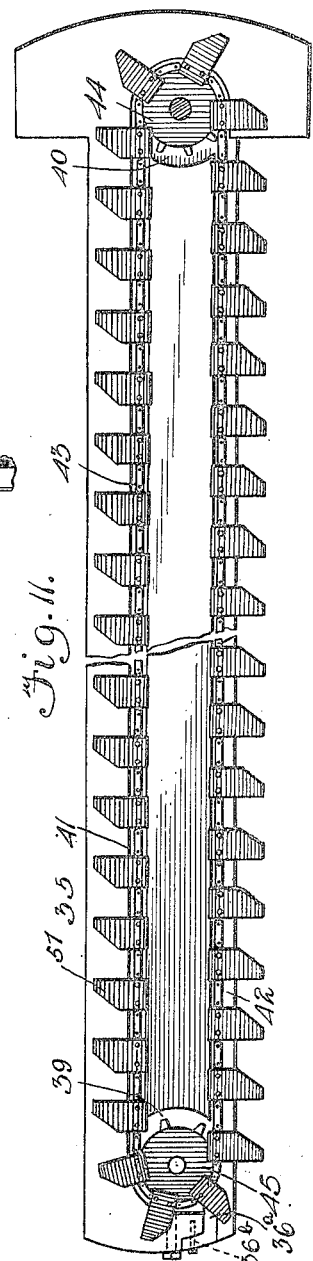

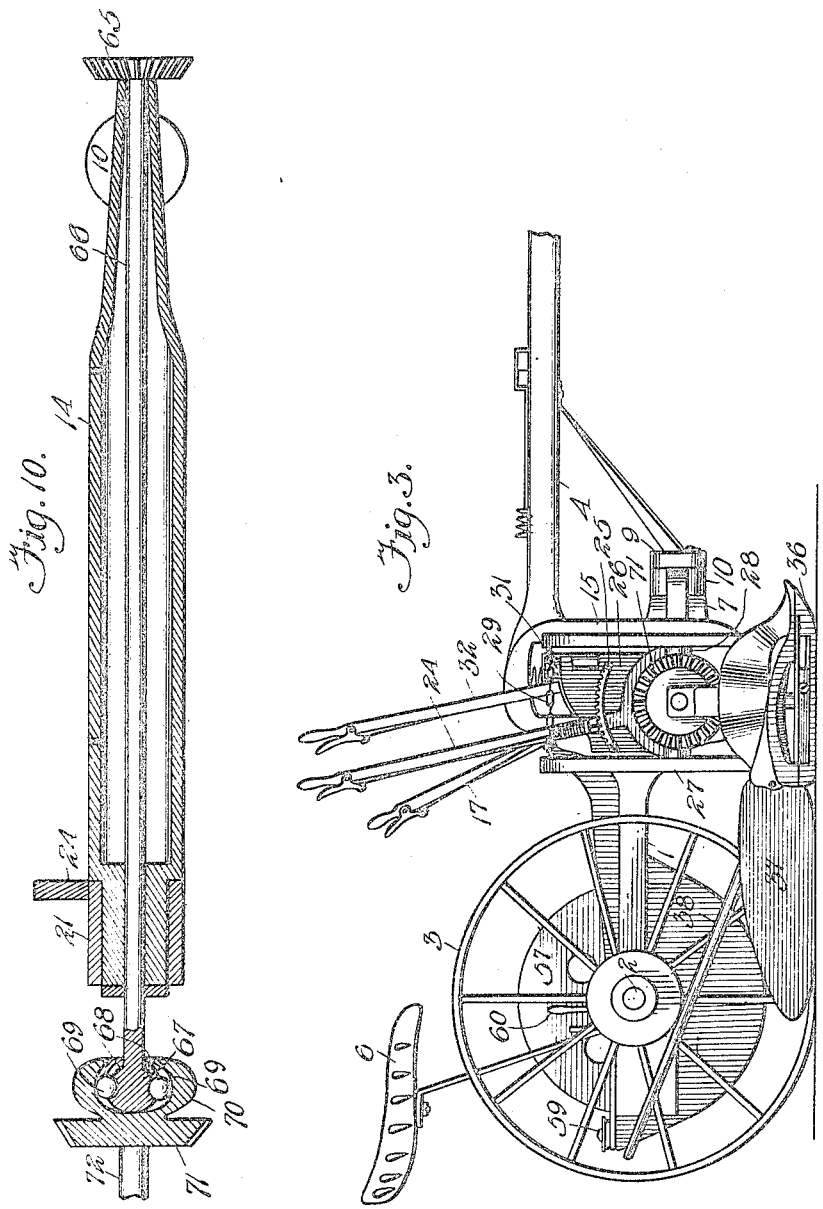

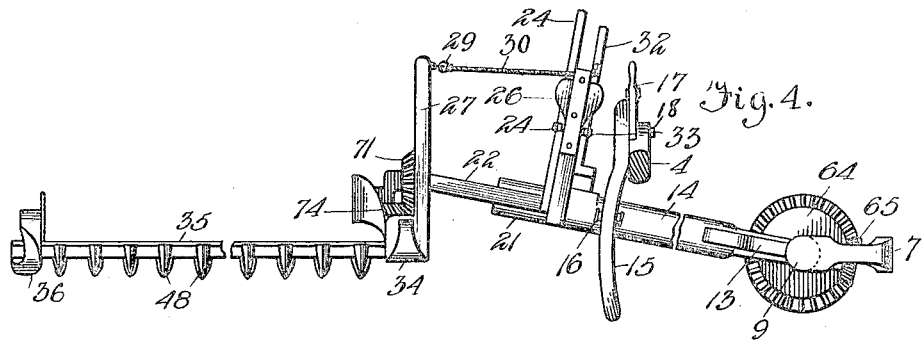
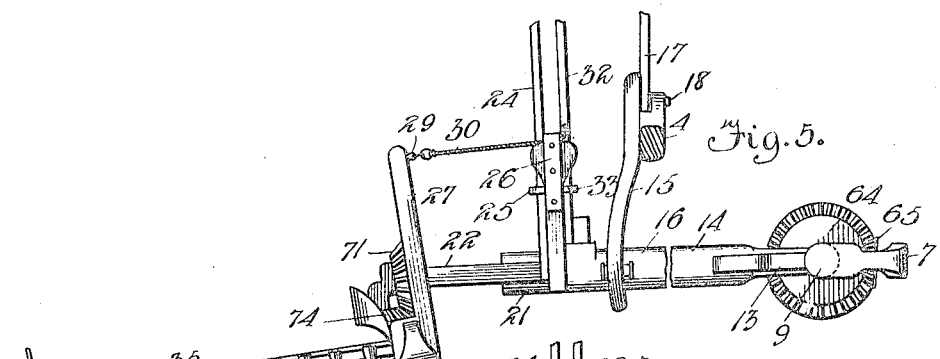
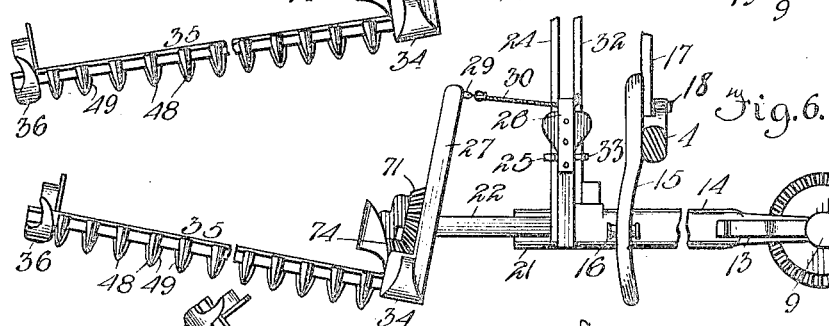
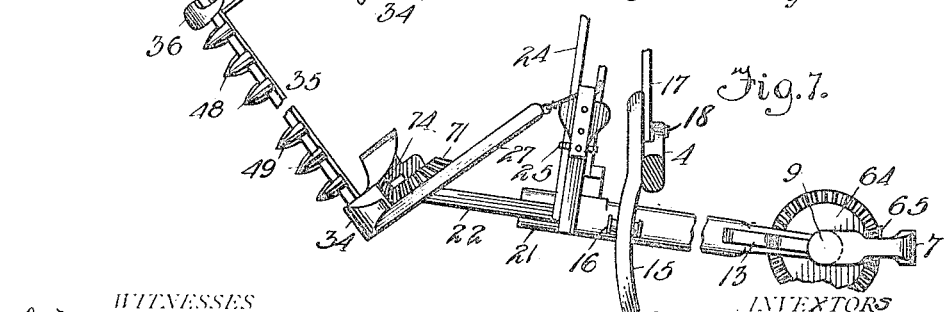

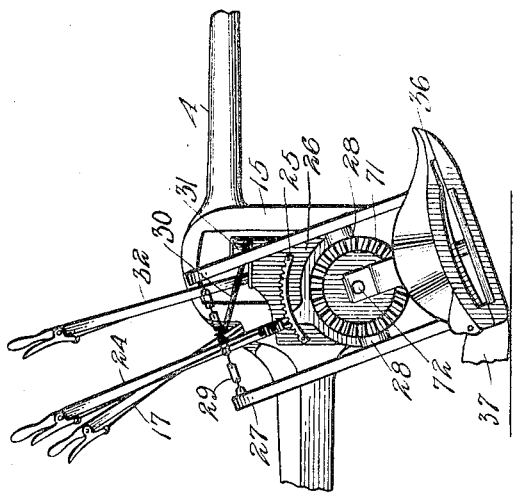

UNITED STATES PATENT OFFICE.

MARTIN HELGESON AND OLAUS HELGESON, OF MADELIA, MINNESOTA.

HARVESTER.

1,057,392.

Specification of Letters Patent.  Patented Mar. 25, 1913.

Application filed March 28, 1910. Serial No. 552,011.

*To all whom it may concern:*

Be it known that we, MARTIN HELGESON and OLAUS HELGESON, citizens of the United States, residing at Madelia, Minnesota, have invented certain new and useful Improvements in Harvesters; and we do hereby declare the following to be a full, clear, and exact description of the invention, such as will enable others skilled in the art to which it appertains to make and use the same.

Our invention relates to harvesters and, in particular, to mowing machines for the reaping of standing grain, grass and the like.
The object of the invention is to provide a machine of light draft, as noiseless as practicable in operation, adapted to use on uneven ground or on a hillside, easily adjusted to such inequalities from the driver's seat, one that will with full efficiency cut close to or at a considerable distance above the ground, and that can readily pass clear of obstructions such as stones and stumps.

The objects of the invention are attained by employing an endless cutter in conjunction with certain adjustable connections which enable the finger bar to be tilted about its longitudinal axis and to be raised bodily with the cutter and also inclined in either direction through a wide range without detracting in any way from the efficiency of the driving connection or the operation of the cutter.

The invention, as hereinafter particularly set out in the claims, will now be fully described by reference to the accompanying drawings, wherein—

Figure 1 is a perspective view of a mower embodying the invention; Fig. 2 is a top plan with the gear cover removed; Fig. 3 is a side view; Fig. 4 is a fragmentary view showing the cutting mechanism elevated bodily; Fig. 5 is a similar view with the cutter adjusted to mow upon the downward slope of a hillside; Fig. 6 shows the adjustment to operate on an upward slope; Fig. 7 shows the cutter elevated to clear obstructions or travel to and from the field; Fig. 8 is a fragmentary view showing the finger-bar tilted to depress the guard fingers; Fig. 9 is a similar view with the guard fingers elevated; Fig. 10 is a section through the supporting arm; Fig. 11 is an enlarged detail of the finger-bar cut away to show the construction of the cutter; and Figs. 12 and 13 are details.

The harvester as illustrated comprises a carriage 1 having an axle 2 supported by the wheels 3 and rigidly connected with the tongue 4 by the hounds 5, the driver's seat 6 overhanging to the rear as is usual to compensate in a measure for the weight of the cutting mechanism in front. A bracket 7 extends forwardly from the hounds on the inner side of the carriage or opposite that from which the finger-bar projects. This bracket has oppositely disposed, inwardly projecting pintles 8 and 9 which serve as bearings for the trunnions 10 and 11 carried by the two branches 12 and 13 of the tubular supporting arm 14. The arm 14 extends across in front of the carriage frame for a distance substantially coextensive with the width of the carriage, and being pivoted at its inner end upon the pintles 8 and 9 may swing in a vertical plane at right angles to the direction of movement of the carriage, and is guided in such movement within the guide frame 15 secured to the carriage hounds and tongue. Anti-friction rolls 16 arranged on each side of the arm 14 and bearing against the inner face of the guide-frame provide for the easy operation of the same. A lever 17, fulcrumed to the tongue 4 at 18, is connected with the arm 14 by means of the chain 19, and serves to raise and lower or hold the arm in any desired position by engagement with the segment plate 20 on the side of the tongue. Upon the outer end of the arm 14, beyond the guide-frame, is rotatably mounted a hub 21 having studs 22 and 23 projecting from each side thereof parallel to the axis of the hub. This hub has rigidly attached thereto a lever 24 by means of which the same may be rotated upon the arm 14 and held in any desired position by engagement with the segment plate 25, secured on the outer side of the standard 26, carried by the arm. A yoke 27 embraces the two studs 22 and 23 in its medial portion and is pivoted thereon at 28. At the top of the yoke is arranged a chain or the like 29, and this, in turn, is joined by a flexible connection such as a chain or rope 30 passing around the pulley 31, upon the standard 26, to a lever 32, fulcrumed upon the standard and held in any adjusted position by a segment 33 upon the inner side of the standard.

The lower extremity of the yoke 27 has rigidly affixed thereto the inner shoe 34 of the finger-bar 35, and the latter is therefore rigidly held at substantially right angles to the yoke 27 and is tilted upon the pivots 28 by the operation of the lever 32 so as to hold the finger-bar at an inclination adapted to a hillside or declivity. The finger-bar 35 therefore extends laterally beyond the carriage for its full length and is held rigidly at right angles to the direction of movement of the carriage but is freely adjustable within a vertical plane. Upon the outer extremity of the finger-bar is fixed a shoe 36 and to the latter is attached the track-board 37 with its fender 38. In the upper face of the finger-bar are formed two recesses 39 and 40 near the extremes of the bar. These recesses are about one inch deep and they are connected by two grooves 41 and 42, which are tangent to such recesses and form a track for the endless chain 43 passing about the chain-wheels 44 and 45, the former rigidly mounted in the inner recess and the latter adjustably mounted in the outer recess within a clevis 46 having a threaded bearing by means of the bolt 47 in the outer shoe. The chain-wheels rotate and the chain travels in a horizontal plane with their upper faces substantially flush with the upper face of the finger-bar. Guard fingers 48 are arranged at intervals along the forward edge of the finger-bar and are secured thereto below by strap runners 49 and above by plates 50, let into the upper face of the finger bar and secured to the same and to the guard fingers. An endless cutter is formed of segments 51, firmly secured along their inner edges to the chain links and resting upon the upper face of the finger-bar in the rear and upon the plates 50 in front. Being attached to the chain these segments constitute an endless cutter traveling between the inner and outer extremities of the finger-bar in an endless path over the upper face of the bar and between the guard fingers upon the plates and serve to cut the standing grain, grass or the like in the path of the finger-bar. A cover-plate 52 overlies the cutter and is removable as a whole, but is also preferably provided with a hinged section 53 giving access to the interior mechanism.

The manner of insertion and removal of the chain with its cutter segments will be obvious from an examination of Fig. 13. In the outer shoe 36 is removably seated a slide 36ª which, when removed by loosening the screw fastening 36ᵇ, leaves a channel 36ᶜ in line with the chain groove 42. To remove the chain for any purpose, the machine being out of gear, the hinged cover 53 is opened and the chain pulled around by hand or a suitable hook until the usual coupling link appears and is uncoupled. The chain is then pulled around until its end is in line with the channel 36ᶜ, when by the hook it can be drawn out through the channel. To replace, the operation is reversed, the chain being inserted through the channel and pushed in until its first link engages with the teeth of the chain wheel 44 which is turned to draw the chain entirely in and the ends of the chain meet at chain wheel 45 adjacent the channel. The movement of the chain is then reversed until the ends of the chain are brought to the point where they were uncoupled. They are then coupled together, the slide 36ª replaced and the cover 53 closed, when the machine is ready for operation.

The cutter mechanism is driven, as is usual, from the drive wheels of the machine, the axle 2 carrying splined thereon a clutch member 54 yieldingly pressed by the spring 55 into engagement with the second clutch member 56, carried by the drive pinion 57. The pinion 57 may be thrown into or out of gear by means of the lever 58 fulcrumed at 59, and bearing with one arm against the clutch member 54, the other arm provided with a handle 60 arranged to hold the clutch members apart when in engagement with the ratchet 61.

A drive shaft 62, journaled in the carriage and passing centrally through the pintle 8, is provided on its inner end with the beveled pinion 63 meshing with the drive pinion 57 and upon its outer end with the pinion 64, meshing with the pinion 65, carried by the inner end of a transmission shaft 66, which is journaled within and extends the full length of the supporting arm 14. The outer end of the transmission shaft has formed thereon a knob 67 with oppositely arranged longitudinal recesses 68 for the reception of balls 69 mounted in recesses in the inner face of a socket plate 70, carried, together with a pinion 71, by the stub shaft 72, journaled in a bracket 73, rigidly secured to the inner shoe 34 of the finger-bar and to the yoke 27. This pinion 71 meshes with another pinion 74, fixed upon the axle of the inner chain wheel 44.

It will be seen that the supporting arm 14 is so pivoted in line with the axis of the drive-shaft that its pinion 65 maintains a constant relation to the pinion 64 regardless of the raising and lowering of the supporting arm by means of its lever. The universal joint between the transmission shaft and the beveled pinion, driving the chain wheel and composed of the knob 67 and the socket 70, enables the finger bar with its mechanism to be tilted about the pivot 28 and also enables the same mechanism, together with the yoke 27, to be turned upon the arm 14 without disturbing the driving connection between the transmission shaft and such mechanism.

The combined mechanism whereby the finger-bar may be tilted upon an axis transverse to the direction of movement of the machine by the partial rotation of the hub 21, and also upon an axis longitudinally of the movement of the machine upon the pivots 29, is greatly assisted and the delicacy of adjustment enhanced by the provision of the long supporting bar 14, by means of which the finger bar and its mechanism may be also raised bodily without disturbing its independent adjustments, the movement of such arm being about a pivot removed the full width of the carriage from the inner end of the finger bar.

The operation of the harvesting machine is as follows: The clutch members 54 and 56 being in engagement during the forward movement of the harvester, the motion of the driving wheels 3 is transmitted to the drive pinion 57, and thence through the drive shaft 62 and its beveled pinions 63 and 64, and the pinion 65 to the transmission shaft 66, thence by the universal connection composed of the knob 67 and socket plate 70 to the pinions 71 and 74 and the axle of the inner chain wheel 44, whereby the chain wheel 43 with its cutter segments 51 is driven in an endless path longitudinally on the finger bar 35, cutting the grain between the guard fingers 48. On level ground the finger bar may be lowered until it rests upon the strap runners 49 with the cutter traveling close to the ground and leaving a very short stubble. The height of the stubble may be further reduced by tilting the finger bar forward upon its longitudinal axis by operating the lever 24 to partially rotate the hub 21; or the length of the stubble may be slightly increased by tilting the finger bar backward upon its longitudinal axis if the lever 24 be moved in a reverse direction. By this adjustment the horizontal position of the finger bar is not affected. If it is desired to leave a longer stubble, the finger bar may be elevated bodily by operating the lever 17 to elevate the supporting arm 14 and hold the same with the finger bar at the desired elevation and horizontal.

In case the machine is used to mow upon the incline of an elevation or declivity, adjustment is effected by means of the lever 32 acting upon the yoke 27 to tilt the finger bar about the pivotal point of the yoke so that the same shall project from the carriage downward or upward at an inclination. To cut upon a downward slope the lever 32 is thrown forward and the weight of the outer end of the finger bar causes the same to drop; on the other hand for use upon an upward incline the lever 32 is drawn backward toward the operator and its flexible connection 30 with the yoke 27 lifts the free outer end of the finger bar to the proper degree of elevation. The adjustment of the finger bar to cut upon a downward or upper slope can be further accentuated by lifting the finger bar bodily, while in its inclined position, by means of the supporting arm 14 through its lever 17 in order to cut more or less closely to the ground and also to conform to changes in the contour of the land.

To clear obstructions near the inner end of the finger bar both the levers 17 and 32 would be operated, the former to lift the inner end of the finger bar and the latter to permit the outer end to drop so that it would remain in substantially its original relation to the ground. To clear an obstruction near the outer end of the finger bar, the lever 32 only would be employed to lift the outer end while permitting the inner end to remain. If the obstruction were about the center of the finger bar or coextensive therewith the lever 32 would not be used, but the lever 17 would be resorted to to lift the cutting mechanism bodily by means of the supporting arm. It will be noted that by reason of the pivoting of the supporting arm in line with the axis of the pinion 64 of the drive shaft, and by the provision of the universal connection between the outer end of the transmission shaft and the pinion driving the inner chain wheel, the raising and lowering of the supporting arm and the tilting of the yoke or the rotation of the hub to secure the various adjustments of the cutting mechanism, do not in any way interfere with the transmission of power from the drive shaft to the cutter, and the various adjustments of the cutting mechanism may be effected while the latter is in full operation.

In traveling to and from the place of operation, the lever 17 would be operated to lift the arm 14 and the cutting mechanism bodily, and in conjunction therewith the lever 32 would be resorted to to tilt the finger bar at an upward inclination to its fullest extent. In order to thus travel idly also the clutch members 54 and 56 would be thrown out of engagement by means of the lever 58 so that the rotation of the wheels 3 would have no effect upon the cutting mechanism.

Having thus fully described our invention, what we claim, is:—

1. In a harvester, the combination, with the carriage, an arm pivoted at one side of the carriage and extending across the same, and means to raise and lower the free end of the arm in an arc about its pivotal point, of a hub rotatably mounted upon the free end of the arm and provided with studs extending therefrom in a direction substantially parallel to the arm, a yoke pivotally mounted in its medial portion upon the studs to swing in a vertical plane parallel to said arm, cutter mechanism rigidly secured to the lower portion of the yoke, a standard carried by the arm, a lever fixed to the hub to rotate the same and engaging with the standard to hold the hub in adjusted relation, a second lever connected with the upper portion of the yoke to tilt the same and engaging with the standard to hold the yoke in adjusted position.

2. In a harvester, the combination with the carriage, a hollow arm pivoted at one side of the carriage and extending across the same, and means to raise and lower the free end of the arm, of a hub rotatably mounted on the free end of the hollow arm, a yoke pivoted at its medial portion to the hub to tilt in vertical plane substantially in line with the arm, a finger-bar rigidly secured to the lower portion of the yoke, a transmission shaft journaled within the hollow arm, means for driving the same from the carriage wheels, means for actuating the cutters of the finger-bar and a drive-connection between said cutter actuating means and the transmission shaft and arranged intermediate the upwardly extending arms of the yoke.

3. In a harvester, the combination with the carriage, an arm pivoted at one side of the carriage and extending across the same, and means to raise and lower the free end of the arm in an arc about its pivotal point, of a yoke pivoted to the free end of the arm, cutter mechanism fixed to the yoke and extending laterally from the carriage, and a hand-lever mounted on the arm and connected to the yoke to tilt the said yoke about its pivotal connection with the arm.

4. In a harvester, the combination with the carriage, an arm pivoted at one side of the carriage and extending across the same, and means to raise and lower the free end of the arm in an arc about its pivotal point, of a hub rotatably mounted on the free end of the arm and provided with studs, a yoke pivotally mounted on the studs to swing in a vertical plane substantially parallel to the arm, cutter mechanism rigidly secured to the yoke, and manually operated means mounted wholly on the arm to tilt the yoke about its pivotal connection with the studs.

5. In a harvester, the combination with the carriage, an arm pivoted at one side of the carriage and extending across the same, and means to raise and lower the free end of the arm in an arc about its pivotal point, of a hub rotatably mounted upon the free end of the arm and provided with studs extending therefrom, a yoke pivotally mounted on the studs to swing in a vertical plane substantially parallel to said arm, cutter mechanism secured to said yoke, a detent, carried by the arm, a lever fixed to the hub to rotate the same and arranged to engage the detent to hold the hub in its adjusted relation, a hand-lever mounted on the arm and connected with the yoke to tilt the same, and means to hold the yoke in its various positions of adjustment.

6. In a harvester, the combination, with the carriage, a hollow arm pivoted at one side of the carriage and extending across the same, and means to raise and lower the free end of the arm in an arc about its pivotal point, of a finger-bar pivotally mounted on the free end of the arm, chain wheels mounted near the inner and outer extremities of the finger-bar, an endless cutter arranged about the chain wheels, a shaft carrying the inner chain wheel, a drive pinion operatively connected with the carriage wheels, a drive shaft gearing with the drive pinion, a transmission shaft journaled within the hollow arm and gearing with the drive shaft, and a flexible drive connection between the end of the transmission shaft and the shaft of the inner chain wheel.

7. In a harvester, the combination, with the carriage, a hollow arm pivoted at one side of the carriage and extending across the same, and means to raise and lower the free end of the arm in an arc about its pivotal point, of a hub rotatably mounted on the free end of the hollow arm, a yoke pivoted in its medial portion to the hub to tilt in a vertical plane substantially parallel to the arm, a finger-bar rigidly secured to the lower portion of the yoke, chain wheels mounted near the inner and outer extremities of the finger-bar, an endless cutter arranged about the chain wheels, a shaft carrying the inner chain wheel, a drive pinion operatively connected with the carriage wheels, a drive shaft gearing with the drive pinion, a transmission shaft journaled within the hollow arm and gearing with the drive shaft, and a universal drive connection between the end of the transmission shaft and the shaft of the inner chain wheel.

8. In a harvester, the combination, with the carriage, a hollow arm pivoted at one side of the carriage and extending across the same, and means to raise and lower the free end of the arm in an arc about its pivotal point, of a hub rotatably mounted on the free end of the arm and provided with a pair of studs extending from each side thereof in a direction parallel to the arm, a yoke pivotally mounted on the studs to swing in a vertical plane substantially parallel to the arm, a lever to rotate the hub and hold the same in adjusted position, a second lever connected with the upper part of the yoke and arranged to tilt and hold the same in adjusted position, a finger-bar rigidly secured to the lower portion of the yoke, chain wheels mounted near the inner and outer extremities of the finger-bar, an endless cutter arranged about the chain wheels, a shaft carrying the inner chain wheel, a drive pinion operatively connected with the carriage wheels, a drive shaft gearing with the drive pinion, a transmission shaft journaled within the hollow arm and gearing with the drive shaft, and a flexible drive connection between the end of the transmission shaft and the shaft of the inner chain wheel.

9. In a harvester, the combination, with the carriage, a hollow arm pivoted at one side of the carriage and extending across the same, and means to raise and lower the free end of the arm in an arc about its pivotal point, of a finger-bar pivotally mounted on the free end of the arm, chain wheels mounted near the inner and outer extremities of the finger-bar, an endless cutter arranged about the chain wheels, a shaft carrying the inner chain wheel, a drive pinion, a clutch between such pinion and the drive wheels of the carriage, a drive shaft gearing with the drive pinion, a transmission shaft journaled within the hollow arm, beveled gears connecting the drive and transmission shafts, a stub shaft, a universal connection between such stub shaft and the outer end of the transmission shaft, and beveled gears connecting the shaft of the chain wheel and the stub shaft.

10. In a harvester, a carriage, a hollow arm pivoted between a pair of trunnions at one side of the carriage and extending across the same, a lever fulcrumed to the carriage and attached to the arm to raise and lower the same, a hub rotatably mounted on the free end of the arm, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the yoke to swing the same upon studs in a vertical plane parallel to the arm, a finger-bar having its inner shoe fixed to the lower portion of the yoke and projecting to one side of the carriage in substantially the same plane as the arm, two chain wheels mounted at the inner and outer extremities of the finger-bar to rotate in a horizontal plane, an endless chain passing around the chain wheels, cutter sections secured to the chain links to form an endless cutter, a shaft carrying the inner chain wheel, a drive pinion, a clutch between the drive pinion and the drive wheels of the carriage, a drive shaft gearing with the drive pinion, a transmission shaft journaled within the hollow arm, beveled gears connecting the drive and transmission shafts, a stub shaft, a universal connection between the stub shaft and the outer end of the transmission shaft, and beveled gears connecting the shaft of the inner chain wheel and the stub shaft.

11. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, a finger-bar having its inner shoe fixed to the lower portion of the yoke and projecting to one side of the carriage in substantially the same plane as the arm, two chain wheels mounted at the inner and outer extremities of the finger-bar to rotate in a horizontal of the finger-bar to rotate in a horizontal plane, an endless chain passing around the chain wheels, cutter sections secured to the chain links to form an endless cutter, a shaft carrying the inner chain wheel, a drive pinion, a clutch between the drive pinion and the drive wheels of the carriage, a drive shaft gearing with the drive pinion, a transmission shaft journaled within the hollow arm, beveled gears connecting the drive and transmission shafts, a stub shaft, a universal connection between the stub shaft and the outer end of the transmission shaft, and beveled gears connecting the shaft of the inner chain wheel and the stub shaft.

12. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, a finger-bar having its inner shoe fixed to the lower portion of the yoke and projecting beyond the side of the carriage in a direction substantially parallel to the arm, a clevis adjustably mounted at the outer end of the finger-bar, a chain wheel carried by the clevis and rotating in a horizontal plane, a second coöperating chain wheel mounted at the inner end of the finger-bar, an endless chain passing around the chain wheels, cutter sections carried by the chain links, guard-fingers arranged on the finger-bar and guiding the cutter, a shaft carrying the inner chain wheel, a drive pinion, a clutch connection between the drive pinion and the drive wheels of the carriage, a drive shaft gearing with the drive pinion, a transmission shaft journaled within the hollow arm, beveled gears connecting the drive and transmission shafts, a stub shaft, a universal connection between the stub shaft and the outer end of the transmission shaft, and beveled gears connecting the shaft of the inner chain wheel and the stub shaft.

13. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, a finger-bar having its inner shoe fixed to the lower portion of the yoke and projecting beyond the side of the carriage in a direction substantially parallel to the arm, a clevis adjustably mounted at the outer end of the finger-bar, a chain wheel carried by the clevis and rotating in a horizontal plane, a second coöperating chain wheel mounted at the inner end of the finger-bar, an endless chain passing around the chain wheels, cutter sections carried by the chain links, guard fingers arranged on the finger-bar and guiding the cutter, a shaft carrying the inner chain wheel, a drive pinion, a clutch connection between the drive pinion and the drive wheels of the carriage, a drive shaft gearing with the drive pinion and journaled in line with the two trunnions of the arm and extending through one of said trunnions, a transmission shaft journaled within the hollow arm, beveled gears connecting the adjacent ends of the drive and transmission shafts, a stub shaft, a universal connection between such shaft and the outer end of the transmission shaft, and beveled gears connecting the shaft of the inner chain wheel and the stub shaft.

14. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, a finger-bar having its inner shoe fixed to the lower portion of the yoke and projecting beyond the side of the carriage in a direction substantially parallel to the arm, a clevis adjustably mounted at the outer end of the finger-bar, a chain wheel carried by the clevis and rotating in a horizontal plane, a second coöperating chain wheel mounted at the inner end of the finger-bar, an endless chain passing around the chain wheels, cutter sections carried by the chain links, guard-fingers arranged on the finger-bar and guiding the cutter, a shaft carrying the inner chain wheel, a drive pinion, a clutch connection between the drive pinion and the drive wheels of the carriage, a drive shaft gearing with the drive pinion and journaled in line with the two trunnions of the arm and extending through one of said trunnions, a transmission shaft journaled within the hollow arm, beveled gears connecting the adjacent angularly disposed ends of the drive and transmission shafts, a knob on the outer end of the transmission shaft with longitudinally extending recesses in its side, a stub shaft having formed on its end a socket to receive the knob, pins extending from the opposite walls of the socket inwardly into the recesses in the knob, and beveled gears connecting the shaft of the chain wheel and the stub shaft.

15. In a harvester, a carriage, a bracket extending forwardly therefrom and provided with oppositely disposed inwardly extending pintles, a hollow arm pivoted within the bracket upon the pintles between a pair of trunnions and extending transversely across the carriage, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, means arranged to rotate the hub upon the arm as an axis, studs projecting from the hub on each side parallel to the arm, a yoke pivoted to the studs and extending above and below such pivotal point, means connected to the upper portion of the yoke to swing the same upon the studs in a vertical plane parallel to the arm, a finger-bar having its inner shoe fixed to the lower portion of the yoke and projecting beyond the side of the carriage in a direction substantially parallel to the arm, said finger bar comprising a pair of chain-wheels and an endless chain provided with cutter sections and engaging said chain-wheels, a shaft carrying the inner chain wheel, a drive pinion, a clutch connection between the drive pinion and the drive wheels of the carriage, a drive shaft gearing with the drive pinion and journaled in line with the two trunnions of the arm and extending through one of said trunnions, a transmission shaft journaled within the hollow arm, beveled gears connecting the adjacent angularly disposed ends of the drive and transmission shafts, a knob on the outer end of the transmission shaft with longitudinally extending recesses in its side, a stub shaft having formed on its end a socket to receive the knob, pins extending from the opposite walls of the socket inwardly into the recesses in the knob, and beveled gears connecting the shaft of the chain wheel and the stub shaft.

16. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, a finger-bar having mounted thereon a pair of chain-wheels and an endless chain provided with cutter sections and engaging the chain-wheels and means to propel the harvester forward and to drive one of the chain-wheels.

17. In a harvester, a carriage, a hollow arm pivoted between a pair of trunnions at one side of the carriage and extending across the same, a guide frame secured to the carriage and embracing the free end of the arm, anti-friction rolls carried by the sides of the arm and bearing on the inner face of the frame, a lever fulcrumed on the carriage and attached to the arm to raise and lower the same within the guide frame, a hub rotatably mounted on the free end of the arm beyond the guide frame, a lever fixed to the hub to rotate the same upon the arm as an axis, studs projecting from the hub on each side parallel to the arm, a yoke pivoted to the studs and extending above and below such pivotal point, a lever fulcrumed on the arm and connected to the upper portion of the yoke to swing the same upon the studs in a vertical plane parallel to the arm, of a finger-bar pivotally mounted on the free end of the arm and having mounted thereon a pair of chain-wheels and an endless chain provided with cutter sections and engaging the chain-wheels, a shaft carrying the inner chain-wheel, a drive pinion, a clutch connection between the drive pinion and the drive wheels of the carriage, a drive shaft gearing with the drive pinion and journaled in line with the two trunnions of the arm and extending through one of said trunnions, a transmission shaft journaled within the hollow arm, beveled gears connecting the adjacent angularly disposed ends of the drive and transmission shafts, a knob on the outer end of the transmission shaft with longitudinally extending recesses in its side, a stub shaft having formed on its end a socket to receive the knob, balls extending from the opposite walls of the socket inwardly into the recesses in the knob, and beveled gears connecting the shaft of the chain wheel and the stub shaft.

In testimony whereof we hereunto affix our signatures in the presence of two witnesses.

MARTIN HELGESON.
OLAUS HELGESON.

Witnesses:
C. S. DAHL,
J. H. BUNNIG.